United States Patent [19]

Vöhringer et al.

[11] 4,354,451
[45] Oct. 19, 1982

[54] DEVICE FOR SPRAY-COATING A WORKPIECE WITH POWDER PARTICLES

[75] Inventors: Gerhard F. Vöhringer; Gerhard Hestermann, both of Friedrichshafen, Fed. Rep. of Germany

[73] Assignee: ESB Elektrostatische Sprüh- und Beschichtungsanlagen G.F. Vöhringer GmbH, Meersburg, Fed. Rep. of Germany

[21] Appl. No.: 214,700

[22] Filed: Dec. 9, 1980

[30] Foreign Application Priority Data

Jan. 30, 1980 [DE] Fed. Rep. of Germany ....... 3003158

[51] Int. Cl.³ .............................................. B05C 15/00
[52] U.S. Cl. ................................ 118/326; 98/115 SB; 118/628; 118/634; 427/345
[58] Field of Search .................... 98/115 SB; 118/326, 118/628, 634; 427/345

[56] References Cited

U.S. PATENT DOCUMENTS 3,791,341 2/1974 Diamond et al. .
4,245,551 1/1981 Berkmann ........................ 118/634 X

FOREIGN PATENT DOCUMENTS 1907709  9/1970  Fed. Rep. of Germany .
2262084  6/1974  Fed. Rep. of Germany .
2430517 11/1977  Fed. Rep. of Germany .
2731123  of 0000  Fed. Rep. of Germany .
2759220  of 0000  Fed. Rep. of Germany .
2809020  of 0000  Fed. Rep. of Germany .
2813854  of 0000  Fed. Rep. of Germany .
2835474  of 0000  Fed. Rep. of Germany .
2369878  6/1978  France .
1315671  5/1973  United Kingdom .
WO79478  7/1979  United Kingdom ........... 98/115 SB
710651  1/1980  U.S.S.R. ............................... 118/634

OTHER PUBLICATIONS

Article entitled "Neues aus der Technik", published in METALLOBERFLÄCHE, vol. 24, 1970, Issue No. 9, p. 349 (no author indicated).
Article entitled "Beschichten metallischer Werkstücke mit Kunststoffpulver", by Friedmund Rüb, published in METALLOBERFLÄCHE, vol. 24, 1970, Issue No. 1, pp. 8–12.

Primary Examiner—Michael R. Lusignan
Attorney, Agent, or Firm—Montague & Ross

[57] ABSTRACT

A booth forming a spraying chamber for workpieces to be coated with powder particles has a substantially fully open front side, giving access to an electrostatic spray gun, and a substantially fully open rear side adjoining a housing of a detachable powder-collecting unit which is open toward the chamber while being separated therefrom by an apertured screen. Tubular filter elements in the housing of the powder-collecting unit, having air-permeable peripheral surfaces, communicate with the suction end of a blower in an overlying clean-air unit, thereby giving rise to an air stream which passes generally horizontally through the chamber from its front side to its rear side and entrains particles discharged by the spray gun. Particles bypassing the workpiece to be coated may traverse the apertured screen and cling to the surfaces of the filter elements from which they may be intermittently dislodged by an air blast directed into these elements from the clean-air unit. The dislodged particles fall into a recovery compartment of the housing which lies below the level of the chamber bottom, this bottom sloping down toward the recovery compartment whereby particles dropping to the chamber floor can slide directly into that compartment underneath the apertured screen. A flexible conduit connects the recovery compartment with the spray gun for recirculation of the particles which, after passing through a strainer, are reconditioned by a fluidized bed in the recovery compartment. Cutouts in the sidewalls and a slot in the roof of the booth enable the introduction and withdrawal of workpieces suspended from above.

9 Claims, 8 Drawing Figures

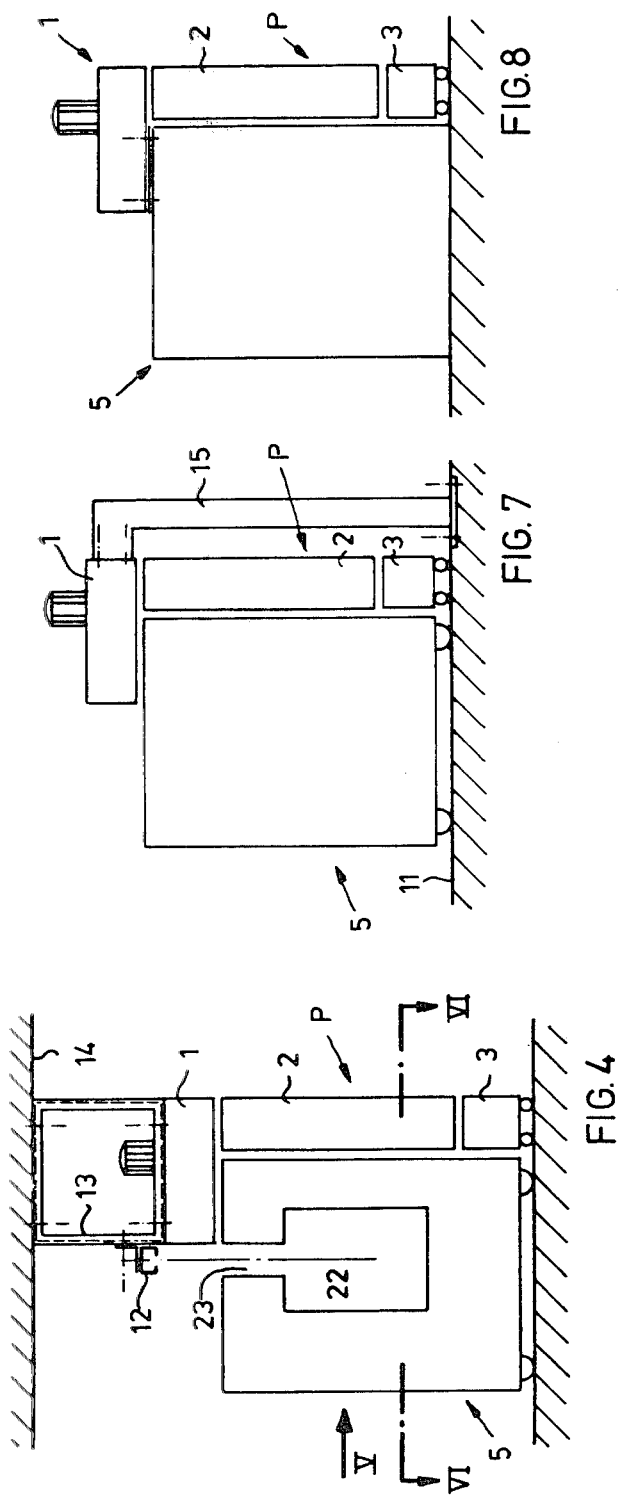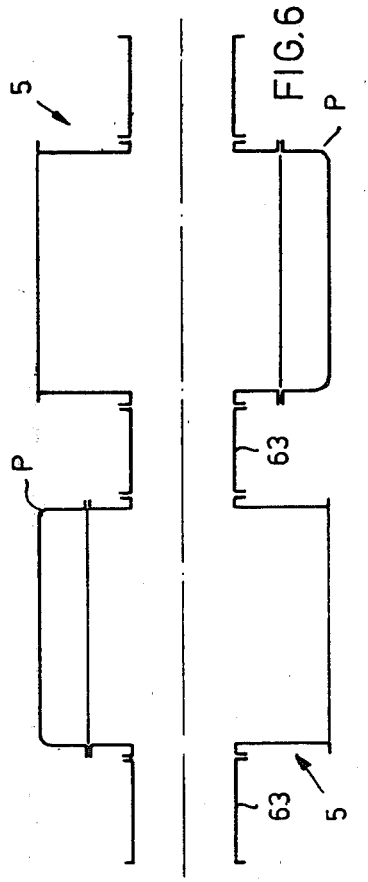

DEVICE FOR SPRAY-COATING A WORKPIECE WITH POWDER PARTICLES

FIELD OF THE INVENTION

Our present invention relates to a device for spray-coating a workpiece with powder particles.

BACKGROUND OF THE INVENTION

In the case of such powder-spraying devices there is, on the one hand, a need for decreasing as far as possible the amount of work necessary on changing the powder so that a changeover to another sort of powder may take place as quickly as possible, while, on the other hand, the device is to take up as little space as possible; this, however, frequently impedes cleaning and powder change.

For example, in the powder-spraying device described in French patent 2,369,878 there is a powder carriage which may be moved out of its position under the spray booth and which is joined by way of a fastener with a stationary aspiration pipe and two compressed-air pipes. Furthermore, the powder carriage has a connection for a spray gun, which is to be energized by way of a separate high-voltage cable. With such a system it is possible to speed up the powder change because only the powder carriage needs to be moved out of its position so that the booth may be cleaned and a new powder carriage can be put in. However, a filter unit is placed between the spray chamber of the booth and its sloping floor while the powder box is placed at a higher level whereby the powder must first be circulated by way of a special transport system before it is able to be strained or sifted and run into the powder box. These details of design make the device unnecessarily complex; trouble conditions are likely and furthermore, for many purposes, the booth is not low enough.

OBJECT OF THE INVENTION

The object of our invention is to provide an improved device of the general type discussed above which has a simplified powder circuit, a spray booth of reduced height and a more dependable mode of operation.

SUMMARY OF THE INVENTION

We realize this object, in accordance with our present invention, by providing a generally prismatic booth with a spray chamber bounded by a substantially fully open front side, a substantially fully open rear side, a pair of sidewalls, a roof and a bottom. A housing of a powder-collecting unit is detachably secured to the booth at its rear side while being substantially fully open toward the spray chamber, this housing forming a recovery compartment below the level of the chamber bottom in which a strainer overlies a fluidized bed. Disposed in the housing above the recovery compartment, opposite the rear side of the booth, are a set of tubular filter elements with air-permeable peripheral surfaces designed to intercept powder particles passing generally horizontally through the spray chamber. The interior of each filter element communicates with suction means for drawing air from the spray chamber through its peripheral surface, thereby setting up a generally horizontal air flow which traverses the spray chamber from front to rear. An electrostatic spray gun, trainable through the front side of the booth upon a workpiece in the spray chamber, is linked with the recovery compartment by conduit means enabling the workpiece to be coated with particles from the powder-collecting unit.

In accordance with a more particular feature of our invention, the suction means communicating with the filter elements comprises a clean-gas unit including an enclosure subdivided into a low-pressure compartment and a high-pressure compartment, a blower in that enclosure having an intake end communicating with the low-pressure compartment and a discharge end communicating with the high-pressure compartment. The latter compartment has an outlet provided with an exit filter downstream of the blower whereas the low-pressure compartment is in communication with the interior of the filter elements.

The clean-gas unit, which preferably overlies the powder-collecting unit and part of the booth, may include a source of pressurized air and timer-operated control means for intermittently directing a blast of such air into different groups of filter elements to dislodge particles adhering to their peripheral surfaces.

The bottom of the spray chamber advantageously slopes down toward the rear side where it may be separated by a gap from an apertured screen extending from the roof of the chamber across the major part of that open side whereby powder particles may slide freely along the sloping bottom into the recover compartment.

BRIEF DESCRIPTION OF THE DRAWING

The above and other features of our invention will now be described in detail with reference to the accompanying drawing in which:

FIG. 4 is an overall view, on a smaller scale, of the booth looking in the same direction as in FIG. 1;

FIG. 6 is a section taken on the line VI—VI of FIG. 4, through a spray-coating production line with two spray booths spacedly joined together;

FIG. 7 is a diagrammatic view of a modification of the assembly of FIG. 4, showing a clean-gas unit supported on an upright post; and FIG. 8 is a view similar to that of FIG. 7, showing another modification.

SPECIFIC DESCRIPTION

Figure 1:
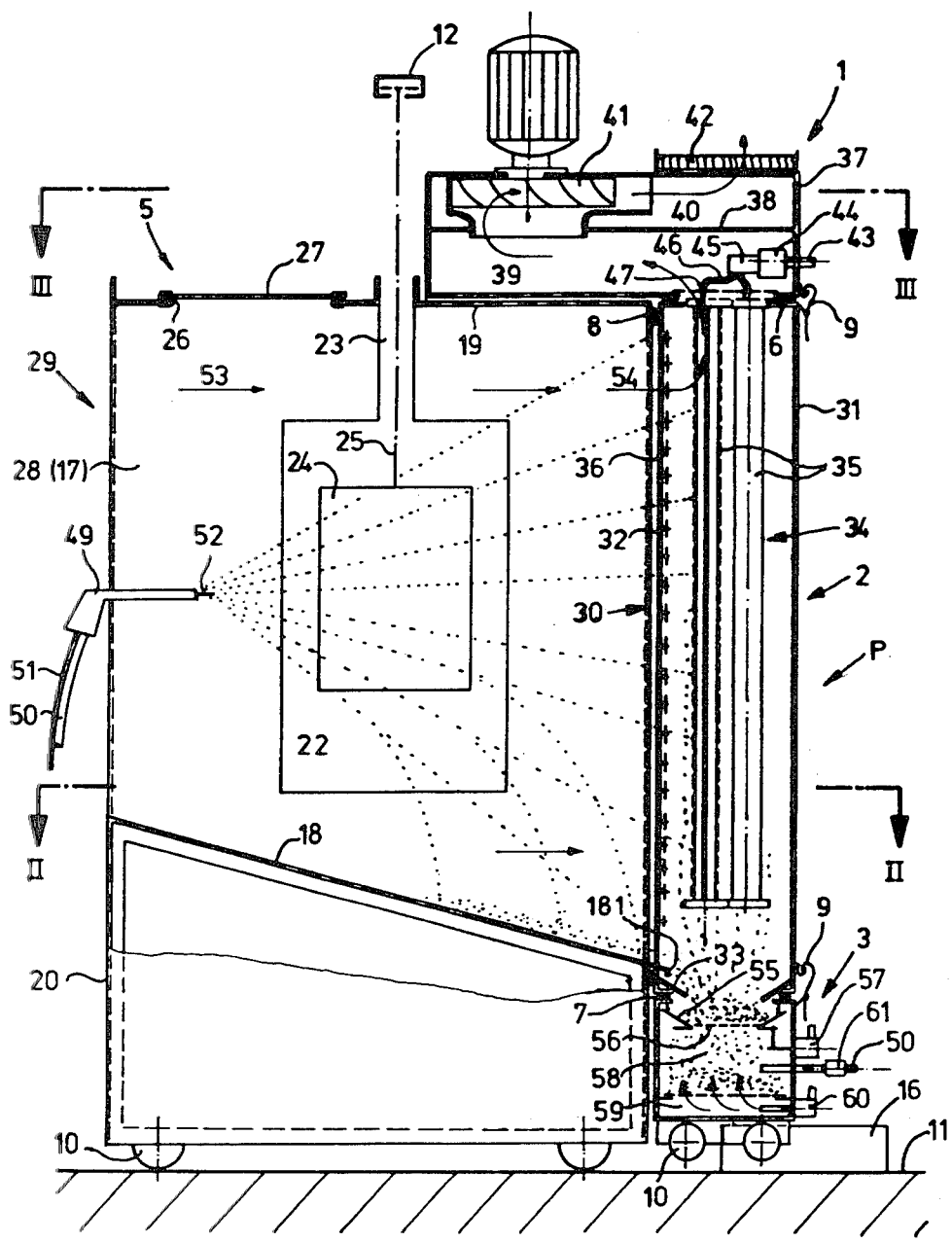
FIG. 1 is a diagrammatic cross-section through a spray booth of a coating device according to our invention on the line I—I of FIG. 5.

As will be seen from FIGS. 1 to 5, a spray-coating device embodying our invention comprises a clean-gas unit 1 fixed in position above a filter unit 2 from which, in turn, a conditioning unit 3 is suspended which, together with the filter unit, constitutes a powder-collecting unit P. This powder-collecting unit adjoins, by way of its filter unit 2, an open rear side of a spray booth 5. The separate units are mechanically interconnected via ring gaskets 6, 7 and 8 by high-speed fasteners 9.

Because the assembly of the device by such fasteners draws the parts closer together, conditioning unit 3 is lifted in operation so that its rollers 10 are pulled clear of the workshop floor 11. After lowering the powder-collecting unit P by releasing one fastener, it is possible for the unit P, together with the spray booth 5, to be moved to the side from and clear of clean-gas unit 1 when the powder is to be replaced for a color changed; it will then be possible for a different combination of a powder unit P and spray booth 5 to take their place.

If, however, conditions are such that it is only necessary for a different powder unit to be installed and if the inner faces of the powder booth are cleaned with a vacuum cleaner, the spray booth may be kept where it is after releasing the fasteners by which it is joined to the powder unit. The spray booth 5 may then be designed as a stationary support for the clean-gas unit 1, with which it is then fixedly joined, as will be seen from FIG. 8. In this case, all further input lines for utilities as needed for operation of conditioning unit 3 may be located on booth 5.

If, for a faster powder change, the booth is to be removable, clean-gas unit 1 (see FIG. 4), which may carry an overhead workpiece-support rail 12, may be suspended by bands 13 from the ceiling 14.

However, as may be seen in FIG. 7, the clean-gas unit 1 may be supported on a post 15, which is in turn mounted on the floor 11 of the workshop.

We prefer to provide the clean-gas unit, as far as possible, with all parts and functional groups which do not come into contact with the powder. An overhead system is, for this reason, more useful because of the shorter air paths connecting it with the filter unit which is somewhat elevated. However, the conditioning unit 3 has to be supplied at least with compressed air and there has to be some way of energizing the spray guns with high voltage. Thus the connection in the assembly of FIG. 8 may be by way of the stationary booth or, as in the embodiments of FIGS. 4 and 7, by way of a hanging line made up of a compressed-air hose and the electric cable. Furthermore, possibly in addition to clean-gas unit 1, we may use a separate connection unit 16 which may be joined with the conditioning unit by suitable connections and which is fixedly positioned on the floor 11 or (in the case of the system of FIG. 7) at the foot part of post 15. If such a connection is desired, it should still be supplied by way of the clean-gas unit and protected together with it.

The spray booth 5 is mainly made up of two sidewalls 17, joined by a rearwardly sloping floor 18 somewhat above ground level, a top wall 19 and a low front wall 20 placed under the floor. In the case of booths designed for continuous production lines, there will be an opening 22 in the sidewalls for the work to be transported into the booth from one side and out of it from the other, a slot 23, stretching as far as the top wall, gives passage to the suspension 25 of a workpiece 24. In the left-hand part of the top wall there is furthermore an opening 26 with a window 27 of glass so that the workshop lighting system may be used for lighting the inside 28 of the spray booth as well. At any rate, it is not necessary to provide a separate lamp with an electrical connection for the booth.

The floor 18, if not oscillated by a vibrator, will have a slope of about 13° to the horizontal for facilitating the downward slide of powder dropped to the floor. When using a vibrator of conventional design, however, the slope may be decreased to about 6° so that the booth may be made even lower.

The spraying chamber 28 increases somewhat in height from its front opening 29 to its rear opening 30, owing to the slope of floor 18, while otherwise having the shape of a smooth parallel-sided tunnel; its rear opening 30, however, is somewhat restricted by projections abutting the ring gasket 8 for housing 31 of filter unit 2.

The rear booth opening 30 is opposite an inlet opening 32, generally of the same size, of housing 31; a downbent lip or edge part 181 of floor 18 extends through opening 32 to let the downwardly moving powder on the floor run safely into the interior of housing 31 and, thus, into its hopper of guide funnel 33.

A filter system 34 in housing 31 is made up of a number of upright tubes 35 for supporting filter material in the form of exchangeable filter sleeves of paper. Filter pipes 35 have a star-like cross-section and are placed in two rows behind booth opening 30 with the pipes in one row offset from those in the other. Between filter pipes 35 and opening 30, there is a guard net or screen 36 whose lower end is closed while its top end is fixed in an aspiration opening of the top plate of housing 31.

Box 37 of clean-gas unit 1 is divided by a horizontal partition 38 into a lower suction or low-pressure compartment 39 and a high-pressure upper compartment 40 for a blower or air-aspirator 41 whose inlet pressure side or space 40 for the aspirator 41, whose inlet opening lies in partition wall 38. In the top wall of box 37, there is a downstream or exit filter 42 through which the aspirated air goes directly into the surrounding space of the workshop. For this reason, even if a filter should burst, no powder will escape into the workshop atmosphere.

In the space not needed for air transport, box 37 contains virtually all parts required for operation of the spraying system which do not come into direct contact with the powder circuit. If the high voltage for the electrostatic field is not to be produced by an external source, a high-voltage generator may be housed here. Compressed air will normally be taken from the workshop system by way of pipe 43, although an air compressor may be placed in the spraying system itself.

Figure 2:
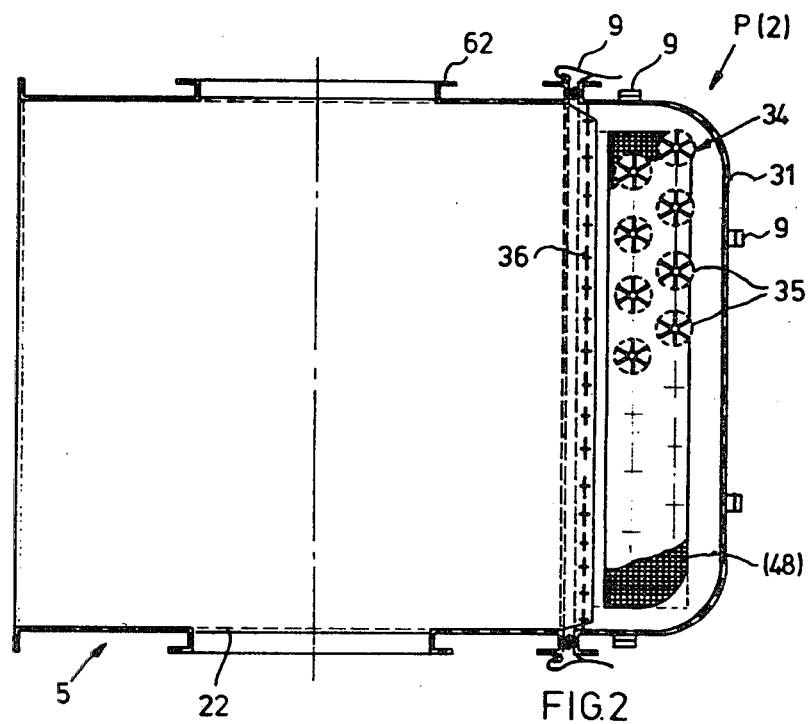
FIG. 2 is a section through this booth taken on the line II—II of FIG. 1.

As will be seen from FIG. 1, pipe 43 is connected, at least indirectly, with an air plenum 44 which is, at all times, under line pressure and works into a controller 45 operated by a timer, for the purpose of briefly opening, an air path from air plenum 44 to about three or four outlets which by way of a number of pipes 46 (FIG. 5) communicate with separate nozzles 47 in a perforated sheet-metal wall 48, FIG. 2 covering an opening in the lower wall of box 47. Each of these nozzles is placed above the middle of the aspiration opening of one filter tube 35.

In normal operation, chamber 28 is used with one or more spray guns 49 of known design connected with conditioning unit 3 by at least one hose 50 and, along the same or some other path, by way of a line 51 with a high-voltage supply. Each spray gun may be fixedly positioned or moved in any way desired. Whereas in the case of a suspended motionless workpiece, as in FIGS. 7 and 8, the gun is to be moved with at least two degrees of freedom, with moving workpieces (as in FIG. 1) the desired effect will be achieved if the gun is reciprocated with vertical swiveling.

An electrostatic field will be produced between the high-voltage electrode 52 and the workpiece 24, the field trapping the powder grains coming from the gun and forcing them to go to the workpiece. The coating efficiency, that is to say the rate at which powder grains adhere to the workpiece, will, as a rule, be between 50 and 95% of the powder coming from the gun 49.

The powder grains not sticking to the workpiece will be flowing to the right in FIG. 1, on the one hand, because of their own kinetic energy and, on the other hand, because of the transport air moving in the same direction, so that the powder will go directly to filter unit 34, as indicated by arrows 53. Whereas part of the powder grains will descend under their own weight onto floor 18 and thus under the filter unit into the hopper 33, a further part of the powder will be transported (see arrow 54) by the aspirated air current and forced onto the exchangeable paper sleeves of filter pipes 35 where such powder will be retained because of the difference in pressure.

The paper covers on the filter pipes let the aspirated air through over their full surfaces, such air going out through the top exhaust opening and through the perforated plate 48 into aspiration space 39 and then leaving the system by way of downstream filter 42.

By way of nozzles 47, compressed air is successively admitted from plenum chamber 44 into a number of groups of filter tubes, in the form of a compressed-air pulse thereby rapidly inflating the filter sleeves for clearing any adhereing powder grains from their outer surfaces, such powder grains then falling directly into hopper 33.

The flow of aspirated air remains generally unchanged because during inflation of some of the filter tubes the flow rate through the other filter pipes will somewhat increase. For this reason we prefer to interleave the filter tubes of a simultaneously cleaned group with tubes of other groups so as to have an even distribution along the entire filter unit. Because, however, the aspiration rate is kept unchanged, spraying may go on continuously without being affected by the cleaning operations.

Conditioning unit 3 has, at its top side, an inlet hopper or funnel 55 placed directly under hopper 33 and conforming generally thereto; a strainer or sifter 56, under hopper 55, is powered by a compressed-air motor 57. Powder box 58 therebelow is of such a size that it may be used as a storing box. Thus, if the device is to be refilled with new powder, it is only necessary for such powder to be deposited onto sifter 56 whereby it is broken up or conditioned together with the powder coming out of the booth and the circuit.

Further conditioning occurs in a fluidized bed over the perforated plate 59 whose supply 60 of compressed air has been illustrated for clarity's sake, like the compressed-air motor 57, outside unit 3. By way of perforated plate 59 all the powder in box 58 is kept moving or vibrated with a fluidizing effect so that it may be taken out by way of a feeder or injector 61 for recirculation, with an even distribution, via hose 50 to spray guns 49. As a rule, four injectors with their hose connections will be necessary.

Figure 3:
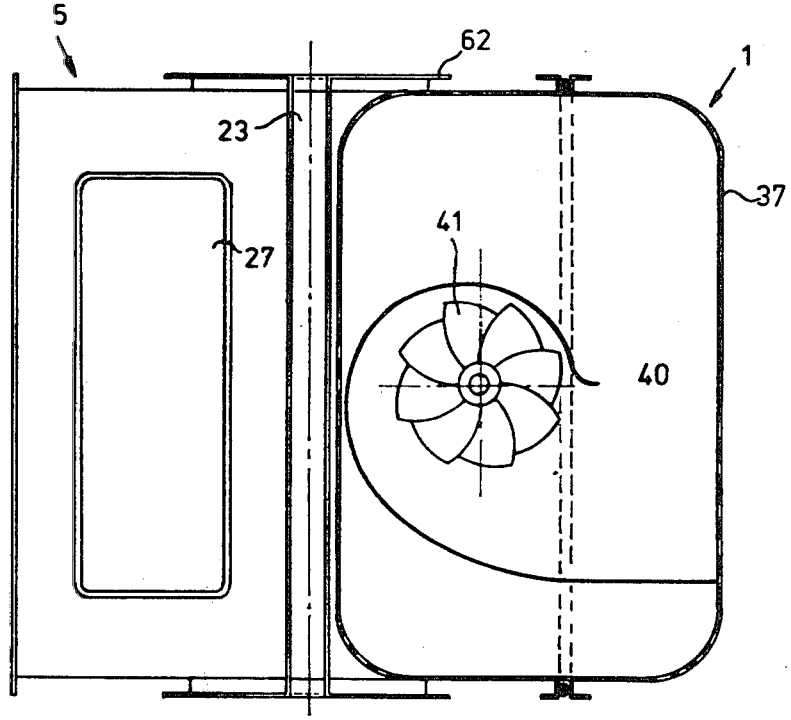
FIG. 3 is a section taken on the line III—III of FIG. 1; as seen
Figure 5:
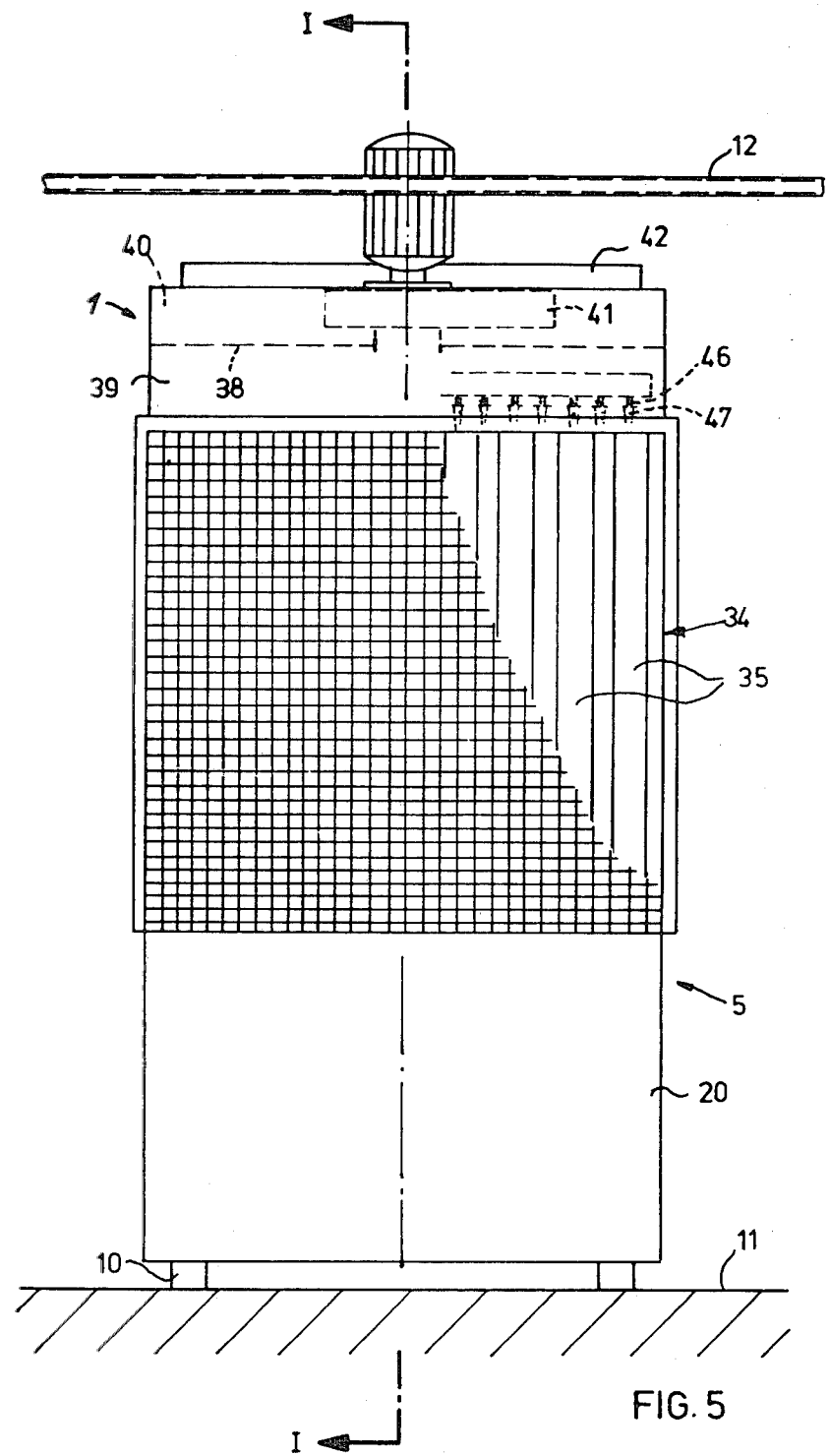
FIG. 5 is a view of the coating device as seen in the direction V in FIG. 4.

As will be seen from FIGS. 2 and 3, a booth designed for use with overhead transport means has flanged connections 62 surrounding their lateral openings 22 for joining a number of booths directly together. However, for preventing the electric field and the air or gas current in one booth from affecting the operation of an adjoining booth, it will be seen from FIG. 6 that short tunnel-like tubes 63 are placed between one booth and the next one. This figure will further make it clear that the powder units P may alternately be placed on the right and on the left of adjoining booths if, for example, the workpiece is to be sprayed in one booth from the front and in the other one from the back.

We claim:

1. A device for spray-coating a workpiece with powder particles, comprising:
    a generally prismatic booth with a substantially fully open front side, a substantially fully open rear side, a pair of sidewalls, a roof and a bottom bounding a spray chamber;
    a powder-collecting unit having a housing detachably secured to said booth at said rear side thereof, said housing being substantially fully open toward said spray chamber and forming a recovery compartment below the level of said bottom including a strainer overlying a fluidized bed;
    a set of tubular filter elements with air-permeable peripheral surfaces disposed in said housing above said recovery compartment opposite said rear side for intercepting powder particles passing generally horizontally through said spray chamber;
    suction means communicating with the interior of said filter elements for drawing air from said spray chamber through said peripheral surfaces, thereby setting up a generally horizontal air flow traversing said spray chamber from said front side to said rear side; and
    conduit means extending from said recovery compartment to an electrostatic spray gun trainable through said front side upon a workpiece in said spray chamber for enabling said workpiece to be coated with particles from said powder-collecting unit.

2. A device as defined in claim 1 wherein said suction means comprises a clean-gas unit including an enclosure subdivided into a low-pressure compartment and a high-pressure compartment, blower means in said enclosure having an intake end communicating with said low-pressure compartment and a discharge end communicating with said high-pressure compartment, and an exit filter in an outlet of said high-pressure compartment downstream of said blower means, said low-pressure compartment being in communication with the interior of said filter elements.

3. A device as defined in claim 2 wherein said clean-gas unit includes a source of pressurized air and timer-operated control means for intermittently directing a blast of said pressurized air into different groups of said filter elements to dislodge particles adhering to the peripheral surfaces thereof.

4. A device as defined in claim 2 or 3 wherein said clean-gas unit overlies said powder-collecting unit and part of said booth.

5. A device as defined in claim 1, 2 or 3 wherein said filter elements have cores of star-shaped cross-section enveloped by paper sleeves.

6. A device as defined in claim 1, 2 or 3 wherein said filter elements are vertically suspended in said housing and extend from the level of said roof to a level near that of said bottom.

7. A device as defined in claim 6 wherein said filter elements are arrayed in two relatively staggered rows parallel to said front and rear sides.

8. A device as defined in claim 1, 2 or 3 wherein said bottom slopes down toward said rear side.

9. A device as defined in claim 8, further comprising an apertured screen extending from said roof across the major part of said open rear side and terminating slightly above said bottom, thereby leaving a gap for a free slide of powder particles along said bottom into said recovery compartment.

* * * * *